United States Patent [19]

Serry et al.

[11] 4,398,212
[45] Aug. 9, 1983

[54] SHIPPING CONTAINER FOR A CLOSED CIRCUIT TELEVISION SYSTEM

[75] Inventors: Frank Serry, Arlington Heights; Edward P. O'Connor, Glen Ellyn, both of Ill.

[73] Assignee: VCS, Inc., Carol Stream, Ill.

[21] Appl. No.: 297,519

[22] Filed: Aug. 31, 1981

[51] Int. Cl.³ ............................................. H04M 7/18
[52] U.S. Cl. ...................................... 358/93; 358/229; 358/254; 206/320; 206/418; 312/7.2
[58] Field of Search ...................... 312/7 TV; 220/1.5; 206/44 R, 320, 418; 358/229, 254, 93

[56] References Cited

U.S. PATENT DOCUMENTS 4,258,387 3/1981 Lemelson et al. .................. 358/229

Primary Examiner—Robert L. Griffin
Assistant Examiner—Edward L. Coles

Attorney, Agent, or Firm—McDougall, Hersh & Scott

[57] ABSTRACT

The container of the present invention includes a box for housing an operatively connected closed circuit television system and having a front end for being opened. A packaging means holds the monitor and camera oriented within the box so that the lens of the camera and the screen of the monitor face the front end of the box. The packaging means also holds the camera and monitor such that the lens can be focused and picture controls on the monitor adjusted by accessing same through the front end. A power cord for connecting the system to an external power source is also accessible from the front end. Upon applying power, the monitor will display the view from the front end of the box as seen by the camera therein testing the system while in the shipping container. A method for testing such a system within the shipping container is also provided.

11 Claims, 4 Drawing Figures

SHIPPING CONTAINER FOR A CLOSED CIRCUIT TELEVISION SYSTEM

BACKGROUND OF THE INVENTION

This invention relates generally to containers for shipping visual systems and more specifically to containers for shipping closed circuit television systems. A closed circuit television system includes a camera, a lens for the camera, a monitor having a screen for displaying a picture, and a cable connecting the camera video output to the monitor.

Typically such systems have been shipped by packaging and shipping each component separately. Although complete systems have been shipped in single containers, the components were also individually packaged separately and were thus not operatively connected as a system.

While such known shipping containers have been successful in protecting the components during shipment, no provision has been made to allow the user to quickly verify that the system does work without unpacking and connecting the components. If the system does function properly, it can be installed. However, if it does not operate properly, the user then has to disassemble the components and repackage them for return to the manufacturer. Thus, initially testing a closed circuit television system shipped in a conventional container requires a substantial effort by the user especially if the system does not work properly and must be returned.

SUMMARY OF THE INVENTION

It is an object of the present invention to provide an improved container for shipping a closed circuit television system which permits the system to be easily and quickly tested in the container.

Another object of this invention is to provide a method for testing such a system while in a shipping container.

The container of the present invention includes a box for housing an operatively connected closed circuit television system and having a front end for being opened first. A packaging means holds the monitor and camera oriented within the box so that the lens of the camera and the screen of the monitor face the front end of the box. The packaging means also holds the camera and monitor such that the lens can be focused and picture controls on the monitor adjusted by accessing same through the front end. A power cord for connecting the system to an external power source is also accessible from the front end. Upon applying power, the monitor will display the view from the front end of the box as seen by the camera therein testing the system while in the shipping container.

In the method of the present invention, a shipping container as generally described above is utilized to test a closed circuit television system disposed therein. The method includes the steps of opening the front end of the box, connecting the system to an external power source, and viewing the picture displayed on the screen of the monitor.

DETAILED DESCRIPTION

Figure 1:
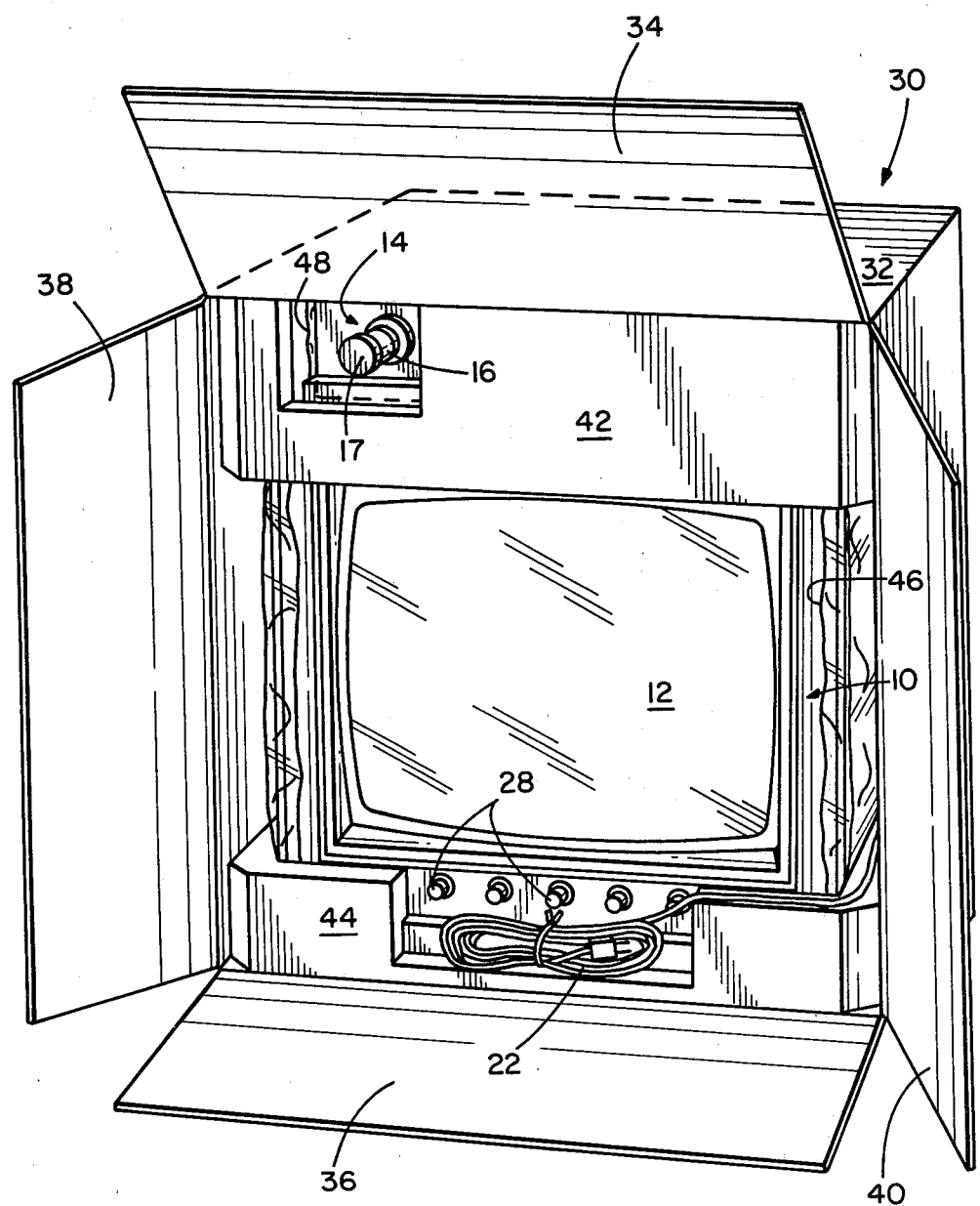
FIG. 1 is a perspective view of an embodiment of the present invention.

Although the shipping container for a closed circuit television system (CCTS) of the present invention is particularly useful for testing the system upon recipt of same, it will be apparent that it is also useful for final testing of the system prior to shipment. This invention provides a container for shipping an operational CCTS, i.e. a system wherein the components are connected and positioned so that upon providing power to the system it can be operated within the container.

Now referring to the drawings, the CCTS includes a monitor 10 having a screen 12, a camera 14 having lens 16 mounted thereto and a lens cap 17, and a cable 18 connecting video information from the camera to the monitor. Preferably the monitor includes a power supply 20 which receives conventional AC power via power cord 22. A power supply 24 provides the required voltages to the camera by cord 26 and is preferably connected to the AC power source through an auxilary power outlet on the monitor. The monitor may have a plurality of manually operable controls 28 such as an ON/OFF switch, horizontal and vertical hold, intensity, and contrast controls which are preferably disposed on or adjacent the front of the monitor.

Figure 2:
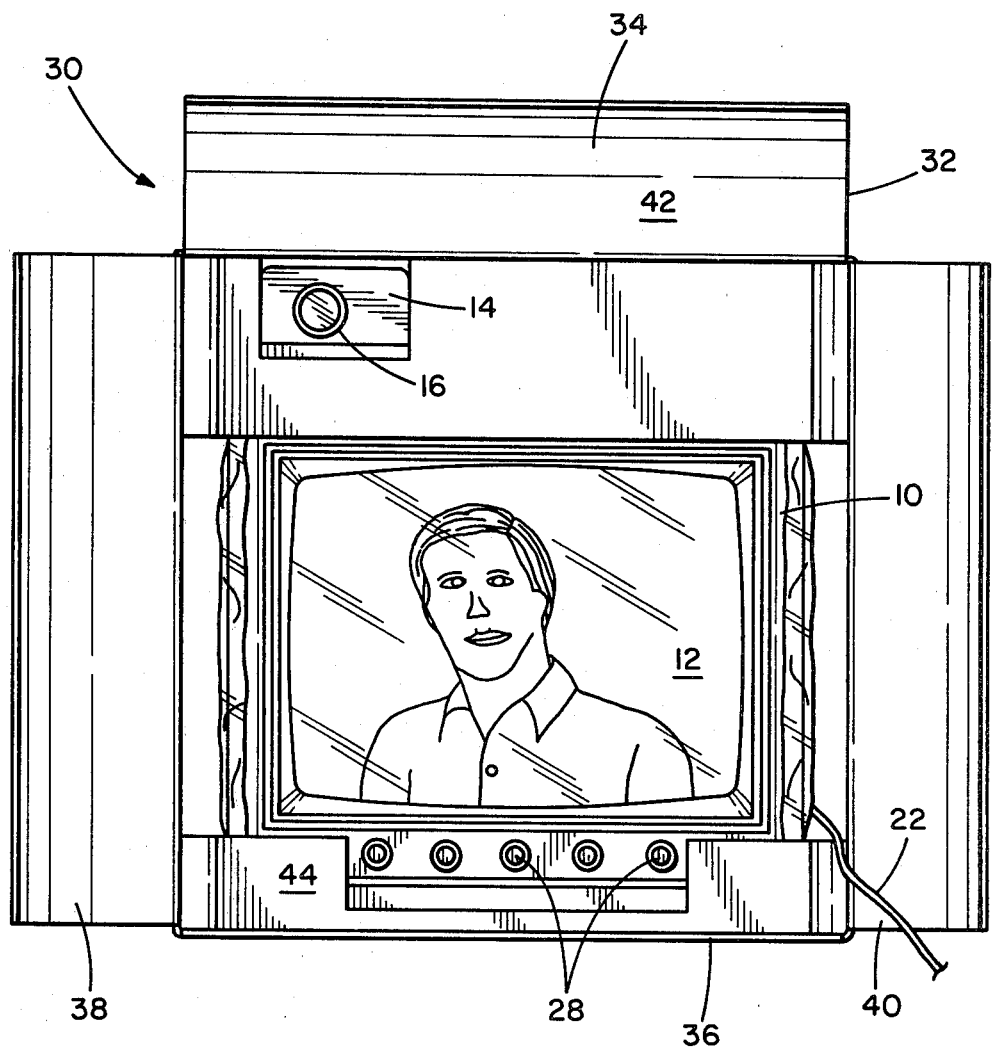
FIG. 2 is a front elevational view illustrating a closed circuit television system which is being operated within the shipping container of the present invention.

FIGS. 1 and 2 illustrate the CCTS disposed in shipping container 30 which includes a box 32 having an open front end defined by flaps 34, 36, 38, and 40. The box may be constructed of any suitable material, such as cardboard or the like. Of course, other types of enclosures having at least one accessible port could be used. Packing inserts 42 and 44 captivate the monitor and camera in stable positions within the box to prevent damage due to shifting. Plastic sleeves 46 and 48 may be used to further protect the finish of the monitor and camera, respectively. It is apparent from the drawings that the lens 16, and monitor controls 28 can be accessed through the open front end of the box as can the power cord 22.

FIG. 1 illustrates the shipping container having been received and the front end opened. To test the CCTS as shown in FIG. 2, the power cord 22 is connected, lens cap 17 removed, if one is provided, and the ON/OFF switch, if not already in the ON position, turned ON. If the person testing the system remains in front of the open end of the box his picture will appear on the monitor's screen as is shown in FIG. 2. This, of course, assumes that the CCTS is functioning properly. If it does not initially function properly, such will be immediately apparent to the person testing the CCTS by the image (or lack thereof) on the screen. If the image cannot be corrected by focusing the lens or adjustment of the controls 28, the CCTS is defective. The defective CCTS is easily and quickly prepared for shipment back to the manufacturer merely by replacing the power cord and lens cap and sealing the front end flaps.

Mounting the camera above the monitor is advantageous because it provides a better camera view especially if the box is placed upon a flat surface such as a desk or bench. It also provides a better angle for manually focusing the lens.

Figures 3, 4:
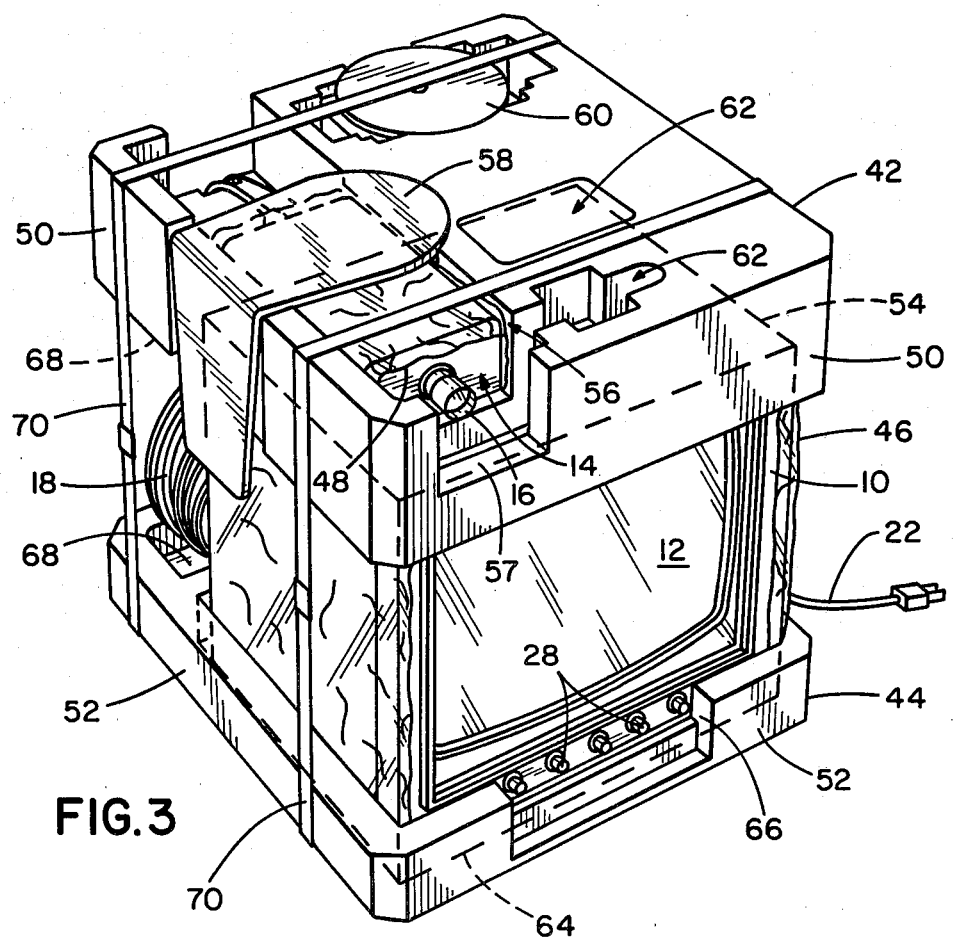
FIG. 3 is a perspective view of an embodiment of the present invention with the box removed for clarity of illustration.
FIG. 4 is a generally rear perspective view of the embodiment as shown in FIG. 3.

Referring in particular to FIGS. 3 and 4, the means of packaging the CCTS within the box is best illustrated. The generally rectangular shaped inserts 42 and 44 may be made of cellular polystyrene and preferably have peripheral side walls 50 and 52, respectively, which have dimensions substantially equal to the corresponding inside wall dimensions of the box against which the side walls adjoin.

Insert 42 has a compartment 54 which receives monitor 10 and defines compartment walls which abut the monitor to prevent lateral movement of the latter. Another compartment 56 receives the camera and has that section 57 of the compartment wall adjacent the lens cut away to provide access thereto. Another section 59 of the rear compartment wall is cut away to allow a path for the cable and power cord. A camera mounting bracket comprised of support bracket 58 and trunion assembly 60 is also held in position by insert 42. Additional compartments 62 provide a means for packing accessories or other items.

Insert 44 has a compartment 64 for receiving the bottom of the monitor. A section 66 of the forward wall of this compartment is cut away to provide access to monitor controls 28. Both inserts, rearward of the monitor, contain opposing compartments 68 for holding cable 18. Straps 70 provide a means for holding the inserts and CCTS together to permit the entire unit as shown in FIG. 3 to be easily inserted into box 32.

It will be apparent from the above that the objects of the present invention have been achieved. The inconvenience of unpacking, assembly, disassembly, and repacking of a defective CCTS has been eliminated. Furthermore, the ability to quickly test or demonstrate a CCTS without removing same from its shipping container will prove useful in a variety of applications.

Although an embodiment of the present invention and a method for using same have been described above, the scope of the present invention is defined by the claims appended hereto.

That which is claimed is:

1. In a container for shipping a closed circuit television system of the type having parts including a camera having a lens mounted thereto, a monitor having a screen for displaying a picture, a video cable for connecting the camera to the monitor, and a power supply cord for delivering power to the system, said container comprising a box for holding said system and having a front end for opening and closing, packing inserts within the box for captivating said parts and maintaining the parts in respective positions within the box, and means for holding the parts and inserts in assembly, the improvement wherein said parts are assembled with said monitor being held in position within said box so that the screen of the monitor faces said front end whereby the screen is viewable through said front end when the front end is open, said lens of said camera being held in position in the box so that the lens is directed toward said front end whereby the lens is exposed to the exterior of the box when the front end is open, said cable being connected between the camera and the monitor, and said cord being accessible for engagement with an external power supply whereby said system can be operated and viewed while disposed in said box without movement of packing inserts and of the means for holding of the parts in assembly.

2. The apparatus according to claim 1 wherein said packing inserts comprise first and second inserts dimensioned to captivate said monitor and camera within the box, said first and second inserts each having side walls having dimensions substantially equal to the adjoining interior wall dimensions of the box.

3. The apparatus according to claim 2 wherein said means for holding comprise strap means for securing said packing inserts to said system.

4. The apparatus according to claim 2 wherein said first and second inserts each have a first compartment for receiving said monitor to prevent movement of said monitor relative to said inserts.

5. The apparatus according to claim 4 wherein said first compartments include peripheral abutment walls for engaging said monitor to prevent lateral movement of the latter.

6. The apparatus according to claim 5 wherein said first and second inserts engage the top and bottom respectively of said monitor.

7. The apparatus according to claim 6 further comprising a second compartment in said first insert for receiving said camera and lens.

8. The apparatus according to claims 2 or 6 further comprising opposing compartments defined by said first and second inserts for holding said cable in a position between said first and second inserts, said opposing compartments being located adjacent the rear walls of said camera and monitor, the respective ends of said cable being connected to the respective rear walls.

9. The apparatus according to claim 1 further comprising manually operable controls disposed on said monitor adjacent said screen, and a packing insert positioned adjacent the controls defining a cut-out section to permit access to said controls while said system is in said box.

10. The apparatus according to claim 1 wherein a packing insert positioned adjacent said lens defines a cutout section for accessing said lens so as to enable exposing of the lens to permit manual adjustment of the lens when said front end is open and while said system remains in said box.

11. A method for utilizing the apparatus of claim 1 comprising the steps of:
 (a) opening said one end of the box;
 (b) connecting said power cord to a source of power thereby applying power to the system;
 (c) adjusting the camera lens and the controls on the monitor as necessary; and
 (d) viewing the picture displayed on the screen of the monitor, thereby testing said system in its shipping container.

* * * * *